Figure 1:
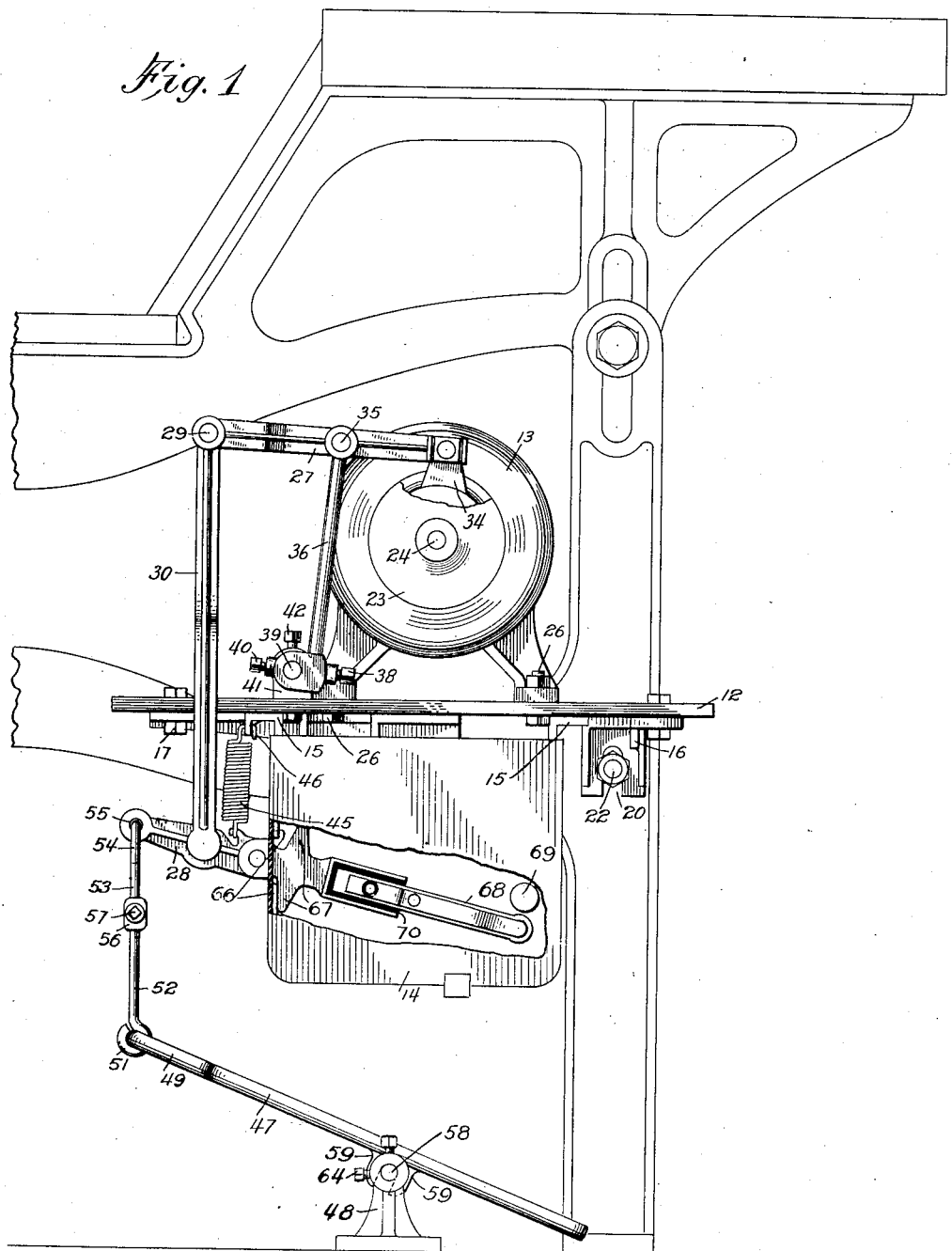

M. TAIGMAN.
ELECTRIC MOTOR DRIVING UNIT.
APPLICATION FILED MAR. 24, 1913.

1,080,388.

Patented Dec. 2, 1913.

3 SHEETS—SHEET 1.

WITNESSES

INVENTOR
Max Taigman
BY
ATTORNEYS

M. TAIGMAN.
ELECTRIC MOTOR DRIVING UNIT.
APPLICATION FILED MAR. 24, 1913.
1,080,388.
Patented Dec. 2, 1913.
3 SHEETS—SHEET 2.
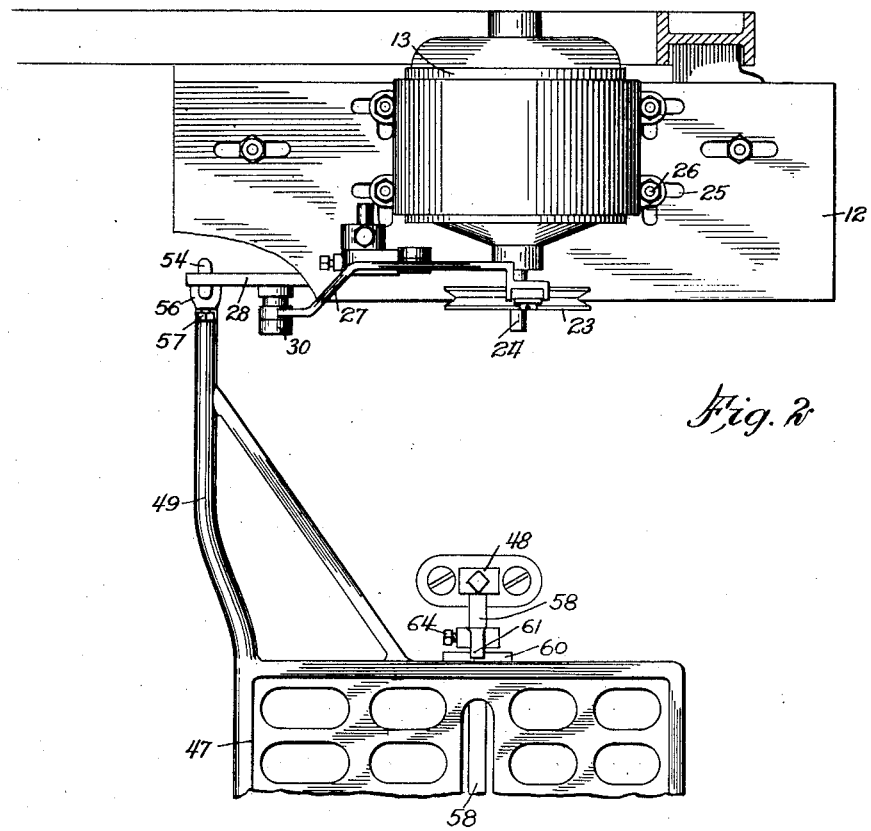
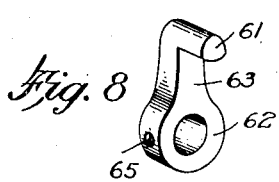
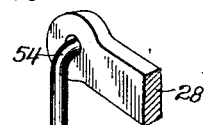
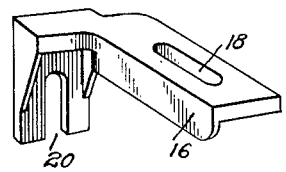
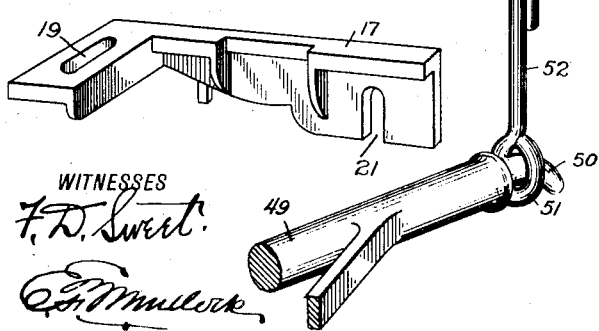
WITNESSES
F. D. Swert
E. F. Mullerk
INVENTOR
Max Taigman
BY Mumm & Co
ATTORNEYS

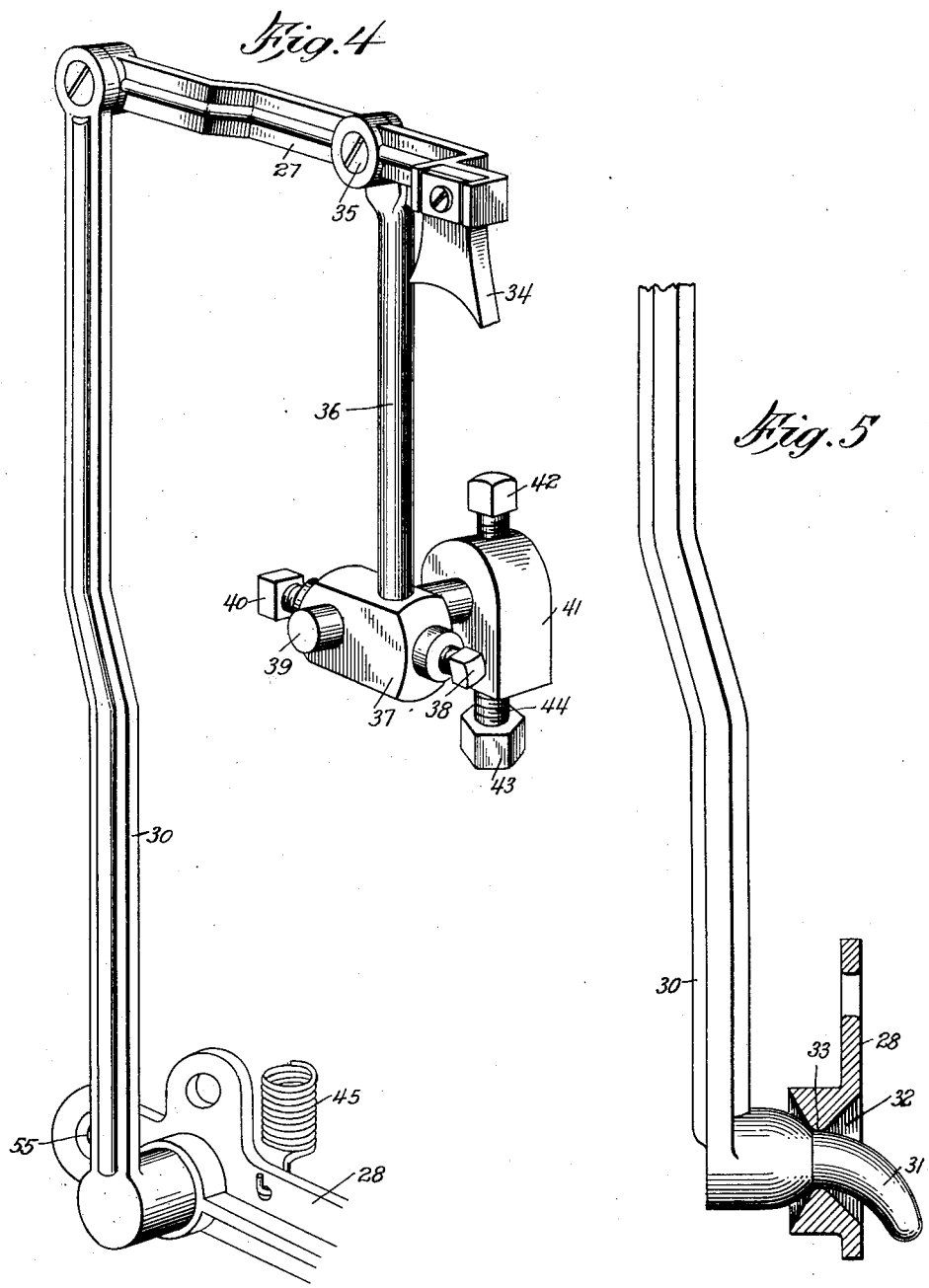

UNITED STATES PATENT OFFICE.

MAX TAIGMAN, OF NEW YORK, N. Y.

ELECTRIC-MOTOR DRIVING UNIT.

1,080,388.

Specification of Letters Patent.

Patented Dec. 2, 1913.

Application filed March 24, 1913. Serial No. 756,420.

*To all whom it may concern:*

Be it known that I, MAX TAIGMAN, a citizen of the United States, and a resident of the city of New York, borough of Manhattan, in the county and State of New York, have invented a new and Improved Electric-Motor Driving Unit, of which the following is a full, clear, and exact description.

The present invention relates to improvements in individual motor equipments for power-driven machines, and more particularly to equipments to be installed for operating bench machines and controlled by means of foot-operated devices.

Among the principal objects which the present invention has in view are: To provide a motor unit mounted as an individual portable member ready for immediate installation and for immediate removal from service position with the minimum of labor expended; to provide a unit of the character mentioned, the members whereof are disposed in compact form to minimize the necessary space occupied by the unit; and to provide a universal adjustment of the unit members to adapt the same for adjustment to existing conditions.

One embodiment of the present invention is shown in the accompanying drawings, in which—

Figure 1 is a side view of a bench and supporting stand therefor of conventional character, and a motor driving unit constructed and arranged in conformity with the present invention; Fig. 2 is a top plan view of said unit, a portion of the stand being shown in section; Fig. 3 is a detail view, on an enlarged scale and in perspective, of an extensible connecting rod for uniting the starting lever of the motor unit, and a foot treadle for controlling the same; Fig. 4 is a detail view, on an enlarged scale and in perspective, showing a fragment of the starting lever, the brake lever, connecting rod uniting said levers, and pivotal mounting for the brake lever; Fig. 5 is a detail view, on an enlarged scale, of the lower end fragment of said connecting rod, and showing in conjunction therewith a cross section of the starting lever of the electric-circuit-controlling apparatus. Figs. 6 and 7 are detail views, on enlarged scale and in perspective, of the supporting brackets for the unit; Fig. 8 is a detail view in perspective, of one of the adjusting retainers for the controlling treadle.

As seen in the accompanying drawings, the plate 12 provides bolting means for an electric motor 13 of suitable design, and a starting box 14 likewise of suitable design. The motor 13 is preferably mounted on the upper side of the plate 12, while the box 14 is suspended by means of brackets 15 from the under side of said plate.

The plate 12 is provided with brackets 16 and 17. Said brackets are removably secured to said plate by any suitable fastening device, which is passed through slides in elongated slots 18 and 19. The brackets 16 and 17 are provided respectively, in the vertical walls thereof, with open-ended slots 20 and 21, which slots are adapted to receive fastening bolts, such as the bolt 22, as shown in Fig. 1 of the drawings.

The horizontal extensions of the brackets 16 and 17, in which are formed the slots 18 and 19, extend perpendicular to the face of the stand on which the brackets are mounted. These slots generally extend in mutual parallel relation. When fastening devices are employed for securing the brackets to the plates 12, it is evident that said plate may be moved away from or drawn toward the stands to which the brackets are secured. When the fastening devices, such as the bolt 22, are loosened, it will be seen that the plate 12 and parts mounted thereon may be lifted or depressed within the radius of the slots 20 and 21. In this manner, a certain latitude of movement is provided for the plate 12, to accommodate the exigencies of each installation.

When installing a unit of the character herein described, a further adjustment of the driving pulley 23 is required to aline the same with the driven pulley of the machine with which the motor 13 is operatively connected. To accommodate this adjustment, the armature shaft 24 of the motor is preferably elongated to admit of adjustment of the wheel lengthwise thereof. At times, it is desired to change the working location of the motor 13 on the plate 12, and for this purpose the plate 12 is provided with angular slots 25, through which bolts 26 pass to fasten the motor in adjusted position. When loosened, these bolts permit the sliding of the motor lengthwise of said plate, thereby accommodating the disposition of the motor more closely to the exigencies of the installation and the machine to be driven by the motor.

The above adjustment of the pulley 23 and the motor 13 requires that the connection between the brake lever 27 and the starting lever 28 should be flexible in character, to admit of the necessary adjustment thereof, said starting lever being permanently situated in the unit. To this end, the brake lever 27 is connected by a pin 29 to a connecting rod 30, and the connecting rod 30 is connected with the starting lever 28 by means of a curved dowel pin 31. To permit the rocking of the pin 31, the socket 32 formed in the starting lever 28 adjacent the end thereof, is tapered inwardly from both ends to form an annular ridge 33, on which said pin may rock transverse said starting lever. This joint provides for a lateral throw of the connecting rod 30 when the brake lever is moved in or out from the center of the plate 12 in conformity with the adjustment of the pulley 23, so that the shoe 34 may ride in the groove of said pulley.

The movement of the lever 27 and parts connected therewith transverse the extension of said lever requires that said lever shall be mounted on a movable pivot. To this end, the pivot pin 35 is secured in the upper end of a post 36, the lower end of which is slidably mounted in a block 37, wherein it is secured by a set screw 38, when adjusted. To avoid cramping the connection between the brake lever 27 and the post 36, the block 37 is slidably mounted on an extension shaft 39, whereon it is locked in adjusted position by a set screw 40. The shaft 39 is slidably mounted in a pivot block 41, wherein it is secured in adjusted position by a set screw 42. The pivot block 41 is mounted on the plate 12, being secured thereto by a nut 43, the threads whereof engage the threads on the threaded end of a pivot pin 44.

The pivot pin 44, being vertically disposed, permits rotation of the block 41 to move the block 37 in a circle about the center of said pin 44. The angle of the brake lever 27 relative the starting lever 28 may be varied to permit the adjustment of the working position of the shoe 34 to and from the center of the plate 12, to correspond with any twist imparted to the motor 13 in adjusting the same to the driven pulley of the machine to be operated.

The brake lever 27 is operated primarily by the starting lever 28. The starting lever 28 is normally raised by a spring 45, which is anchored upon a hook 46 integrally formed with and extending from the under side of the plate 12. The spring 45, when lifting the starting lever 28 to the normal position where the circuit-wiper thereof rests upon a dead terminal in the rheostat of the starting box 14, lifts the outer end of the brake lever 27, and forces the shoe 34 carried by said brake lever, into the groove of the pulley 23. From this position the levers 27 and 28 are moved by means of a foot-treadle 47, which treadle is pivotally mounted in stands 48 bolted to the floor on which the work-bench supporting-stand is secured. The treadle 47 is provided with a laterally-extending reach-bar 49. The reach bar 49 has at the extreme end a downwardly-bent dowel pin 50, to engage the eyelet 51 of the lower section 52 of the rod operatively connecting said reach-bar and the starting lever 28. The complete means for connecting the reach bar 49 and the lever 28 comprises said lower section 52 which has the eyelet 51, and an upper section 53, which is provided with a hook 54, said hook being adapted for extension through an eyelet 55 provided in the outer end of the lever 28. The sections 52 and 53 are held in operative relation by a clamp 56 and a set screw 57 mounted therein, the manipulation whereof jams the sections 52 and 53 in holding relation each to the other.

From the foregoing, it will be seen that a unit constructed and arranged in accordance with the present invention is assembled in the shop, the motor 13, starting box 14, brake lever 27, and mechanism connecting said brake lever to the starting lever of the starting box, all being secured to the plate 12, to be transported as a unit to the place of installation. For transportation purposes, the treadle 47 and parts connected therewith, inclusive of the connecting rod formed by the sections 52 and 53, are disconnected from the lever 28.

On arrival at the place of installation, the slots 20 and 21 of the brackets 16 and 17 are slipped over bolts, such as 22, with which the supporting stand for the workbench is provided. Should it happen that the stand is not thus provided, the bolts are then added to the standing structure.

The driving belt of the machine to be driven is adjusted to the driving pulley 23. To aline the driving pulley 23 with the driven pulley, the adjustments above described are made. Thus, if the length of belt requires the adjustment of the plate 12, the nuts on the bolts 22 are loosened to permit the lifting or lowering of the plate 12 and parts supported thereon, said nuts being tightened to hold the plate fixedly in position after the proper adjustment has been obtained.

If it be required to shift the motor 13 to place the plane of the pulley 23 in the plane of the driven pulley, this is accomplished by loosening the bolts 26, to permit them to swing into the longitudinal or transverse extensions of the slots 25, thereby swinging the motor on its vertical center. Such an adjustment of the motor would necessarily require a corresponding adjustment of the brake lever 27, which would be effected by loosening the nut 43 to permit the swing of the block 41 and shaft 39 connected therewith, said shaft being disposed in a plane perpendicular to the plane of the pulley 23. The extension of the lever 27 being thus arranged in a plane parallel to the plane of the pulley 23, the post 36 is swung to or from the pulley 23 or outward or inward from or to the center of the plate 12, to place the shoe 34 in alinement with the groove in the pulley 23. To secure the adjustment indicated, the set screws 38 and 40 are loosened to permit the free movement of the block 37 on the shaft 39, and of the post 36 in the said block 37. When all the adjustments have been made, which operation is quickly performed, the various set screws are tightened.

The plate 12 and parts connected therewith having been installed, it remains to mount the treadle 47, and to connect the same with the lever 28. The distance of the unit from the floor being a variable factor, the set screw 57 is released, permitting the sections 52 and 53 to slide in the clamp 56. Said sections 52 and 53 having been connected with the dowel 50 and the eyelet 55 in the manner described, the set screw 57 is tightened to clamp the two sections in holding relation, forming of them a unit connection between the reach bar 49 and the starting lever 28.

In some installations, the pivot rod 58 is supported by means other than the stands 48, the common method being to provide in the bench supports or stands a bearing for said rod. In this event, it is found particularly desirable to set the working position of the treadle 47 relative the motor unit and without disturbing the arrangement of the rod 58. To avoid the removal of the rod, I provide lugs 59 cast on the treadle 47 and spaced apart to straddle as a yoke or saddle the rod 58, so that the treadle may be deposited upon the rod 58 in the manner indicated. To hold the treadle in its set position upon the rod 58, the same is provided with curved flanges 60 cast upon the treadle 47, to extend over which fingers 61 of collars 62 are provided. Each collar 62 is connected with a finger 61 by an arm 63, and is held in service position on the rod 58 by a set screw 64, which registers with the threads of a tapped hole 65 formed in each collar 62, as best shown in Figs. 2 and 8 of the drawings.

When the set screws 64 are loosened, the collars 62 may be spread to free the flanges 60 over which the fingers 61 normally extend. The treadle 47 may be then lifted from engagement with the rod 58.

In the operation of the treadle 47, it becomes desirable to cushion the blow at each end of the throw of the treadle, and for this purpose I provide inside the box 14 and at opposite sides of the lever 28, leather pads 66. The pads 66 form cushions or rests for lugs 67. The lugs 67, when at the extremes of the throw of the treadle 47 and the lever 28, strike upon said pads.

It is to avoid electrifying the treadle 47 and parts connected therewith that I attach to the starting lever 28 a contact arm 68. The contact arm 68 is electrically insulated from the lever 28 by means of a pad 70. The arm 68, in the operation of the apparatus, passes over to form contact with the terminal studs 69 of the starting box 14.

By separating the starting lever 28 and the arm 68 in the manner described, accidental shocking of the operator of the machine through the treadle or parts connected therewith is avoided.

Having thus described my invention, I claim as new and desire to secure by Letters Patent:—

1. In a unit as characterized, a base plate; a motor adjustably mounted on said plate; a brake lever having a shoe to engage said motor and to rest above the same; a pivot post for said brake lever; a link block pivotally mounted and definitely spaced apart from said base plate; means for holding said link block in fixed relation, when adjusted; and means for manually operating said brake lever.

2. A unit as characterized, comprising an electric motor having an elongated armature shaft and a driving pulley adjustably mounted thereon; a base plate adjustably secured to said motor to permit the shifting of said motor; a pivot block definitely mounted on said plate to rotate on a vertical axis thereon; an extension shaft movably mounted in said block; a brake lever having a shoe to engage the driving pulley of said motor from above; a post pivotally connected with said brake lever to support the same in service position; and a link block connecting said extension shaft and said post, said block having perforations therethrough to receive said shaft and post, said perforations being spaced apart and disposed in perpendicular relation each to the other.

3. A unit as characterized, comprising an electric motor having an elongated armature shaft and a driving pulley adjustably mounted thereon; a base plate adjustably secured to said motor to permit the shifting of said motor; a pivot block definitely mounted on said plate to rotate on a vertical axis thereon; an extension shaft movably mounted in said block; a brake lever having a shoe to engage the driving pulley of said motor from above; a post pivotally connected with said brake lever to support the same in service position; a link block connecting said extension shaft and said post, said block having perforations therethrough to receive said shaft and post, said perforations being spaced apart and disposed in perpendicular relation each to the other; and devices mounted in said link block for fixing the adjusted positions of said shaft and said post.

4. A unit as characterized, comprising an electric motor having an elongated armature shaft and a driving pulley adjustably mounted thereon; a base plate adjustably secured to said motor to permit the shifting of said motor; a pivot block definitely mounted on said plate to rotate on a vertical axis thereon; an extension shaft movably mounted in said block; a brake lever having a shoe to engage the driving pulley of said motor from above; a post pivotally connected with said brake lever to support the same in service position; a link block connecting said extension shaft and said post, said block having perforations therethrough to receive said shaft and post, said perforations being spaced apart and disposed in perpendicular relation each to the other; devices mounted in said link block for fixing the adjusted positions of said shaft and said post; and means for locking said pivot block in adjusted position.

5. In a unit as characterized, having a starting lever, a brake lever, and operating means connected with one of said levers; an oppositely-inclined centrally contracted orifice bearing formed in said starting lever; and a rod operatively connecting said levers, said rod having at the end adjacent said starting lever a curved dowel pin laterally extended for insertion through said orifice.

6. In a unit such as described, and in combination, a lever having a connecting orifice the walls whereof are reversely inclined, to form an internal annular ridge; and a rod for connecting said lever with an adjustable member, said rod having a curved dowel pin for insertion through said orifice to bear on said ridge.

7. In a unit as characterized, the combination of a starting lever; a foot-operated treadle; a reach bar extending laterally from said treadle and having at the end thereof a curved dowel pin; a connecting member for said starting lever and said reach bar, embodying separable sections and a uniting clamp therefor; a plurality of oppositely-extending lugs mounted on said lever for disposition inside the starting box of said unit and adjacent the wall of said box; and a plurality of pads disposed in service relation between said lugs and the adjacent wall of said box.

In testimony whereof I have signed my name to this specification in the presence of two subscribing witnesses.

MAX TAIGMAN.

Witnesses:
E. F. MURDOCK,
PHILIP D ROLLHAUS.